(12) United States Patent
Collins et al.

(10) Patent No.: US 7,190,666 B1
(45) Date of Patent: Mar. 13, 2007

(54) IDENTIFICATION OF PRIORITY FAULTS IN A TRANSPORT NETWORK

(75) Inventors: Walter Geoffrey Collins, Hillsborough (GB); John Paul McGrotty, Newtownabbey (GB)

(73) Assignee: Nortel Networks Limited, St. Laurent (CA)

( * ) Notice: Subject to any disclaimer, the term of this patent is extended or adjusted under 35 U.S.C. 154(b) by 1064 days.

(21) Appl. No.: 10/096,033

(22) Filed: Mar. 13, 2002

(51) Int. Cl.
*H04L 12/28* (2006.01)

(52) U.S. Cl. .................. 370/216; 370/539; 370/907

(58) Field of Classification Search ................ 370/216, 370/230, 389, 392, 498, 537, 539, 907
See application file for complete search history.

(56) References Cited

U.S. PATENT DOCUMENTS 6,917,614 B1 * 7/2005 Laubach et al. ............ 370/392

* cited by examiner

*Primary Examiner*—Derrick W. Ferris
(74) *Attorney, Agent, or Firm*—Barnes & Thornburg LLP

(57) ABSTRACT

A first aspect of the invention provides a system for prioritising faults in a transport network comprising network elements arranged to transport data signals comprising respective overhead data and payload data. The system comprises one or more first network elements arranged to include in said overhead data a priority indicator indicating the relative importance of the respective payload data. The system further includes one or more second network elements arranged to examine the respective priority indicator of data signals in respect of which a fault is detected. Detected faults are prioritised using the respective value of the priority indicator and hence on the relative importance of the information carried by the faulty signal.

24 Claims, 3 Drawing Sheets

US 7,190,666 B1

IDENTIFICATION OF PRIORITY FAULTS IN A TRANSPORT NETWORK

FIELD OF THE INVENTION

The present invention relates to the identification of priority faults in a transport network, particularly but not exclusively a SONET (Synchronous Optical Network) and/or SDH (synchronous Digital Hierarchy) transport network.

BACKGROUND TO THE INVENTION

Many different types of faults may occur in a transport network, including continuity errors (e.g. loss of signal), connectivity errors (e.g. trace identifier mismatch), payload type errors (e.g. payload label mismatch), alignment errors (e.g. loss of pointer) and signal degradation. Normally, when a fault occurs, an alarm signal is generated. Transport network management systems can be inundated with alarm signals and these must be analysed in order to determine the relative urgency with which each fault needs attention.

Conventionally, faults are characterised by the type of fault and the size of the signal to which the fault relates. Thus, in an SDH network if a fault is detected in, for example, a traffic signal comprising VC-4 data structures, then a network manager may decide to attend to this fault before attending to a fault in a traffic signal comprising, say, VC-12 data structures, on the basis that the former is a larger data structure that can carry a higher volume of traffic. Alternatively, the network manager may decide to deal with a signal mis-direction (connectivity error) type fault before dealing with a signal degradation type fault.

A perceived problem with this arrangement is that the relative importance of the data carried by the traffic signals is not taken into account. Moreover, network operators are spending relatively large amounts of money on sophisticated fault analysis software and large amounts of time in analysing fault reports. It is therefore desirable to reduce the complexity of identifying priority faults.

SUMMARY OF THE INVENTION

A first aspect of the invention provides a system for prioritising faults in a transport network comprising a plurality of network elements arranged to transport data signals comprising respective overhead data and payload data, the system comprising: one or more first network elements arranged to include in said overhead data a priority indicator indicating the relative importance of the respective payload data; and one or more second network elements arranged to examine the respective priority indicator of data signals, the system being arranged to prioritise the or each fault detected in respect of a data signal using at least the value of the respective priority-indicator.

The priority indicator allows a more informed decision to be made as to how to prioritise faults.

A second aspect of the invention provides an apparatus for use in prioritising faults in a transport network comprising a plurality of network elements arranged to transport data signals comprising respective overhead data and payload data, the apparatus being arranged to include a priority indicator in said overhead data indicating the relative importance of the respective payload data.

A third aspect of the invention provides a method of prioritising faults in a transport network comprising a plurality of network elements arranged to transport data signals comprising respective overhead data and payload data, the method comprising: including in said overhead data a priority indicator indicating the relative importance of the respective payload data; examining, in respect of a data signal for which a fault is detected, the respective priority indicator; and prioritising said detected fault using at least the value of said respective priority indicator.

A fourth aspect of the invention provides a computer program product for use in prioritising faults in a transport network comprising a plurality of network elements arranged to transport data signals comprising respective overhead data and payload data, the computer program product comprising computer useable instructions arranged to cause, when installed in a network element, said network element to include a priority indicator in said overhead data indicating the relative importance of the respective payload data.

A fifth aspect of the invention provides a system for prioritising faults in a transport network in which a data signal is transported across the network along a path comprising one or more network elements, the data signal comprising overhead data and payload data, the system comprising a management apparatus arranged to associate with said data signal a priority indicator the value of which indicates the relative importance of the payload data and being further arranged to communicate the priority indicator to one or more network elements in said path, wherein, upon detection by a network element in said path that said data signal has failed to reach said network element, said network element is arranged to communicate said failure and the value of said priority indicator to said management system.

Preferred features of the invention are set out in the dependent claims.

Other advantageous aspects and features of the invention will be apparent to those ordinarily skilled in the art upon review of the following description of a specific embodiment of the invention and with reference to the accompanying drawings.

The preferred features as described herein above or as described by the dependent claims filed herewith may be combined as appropriate, and may be combined with any of the aspects of the invention as described herein above or by the independent claims filed herewith, as would be apparent to those skilled in the art.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
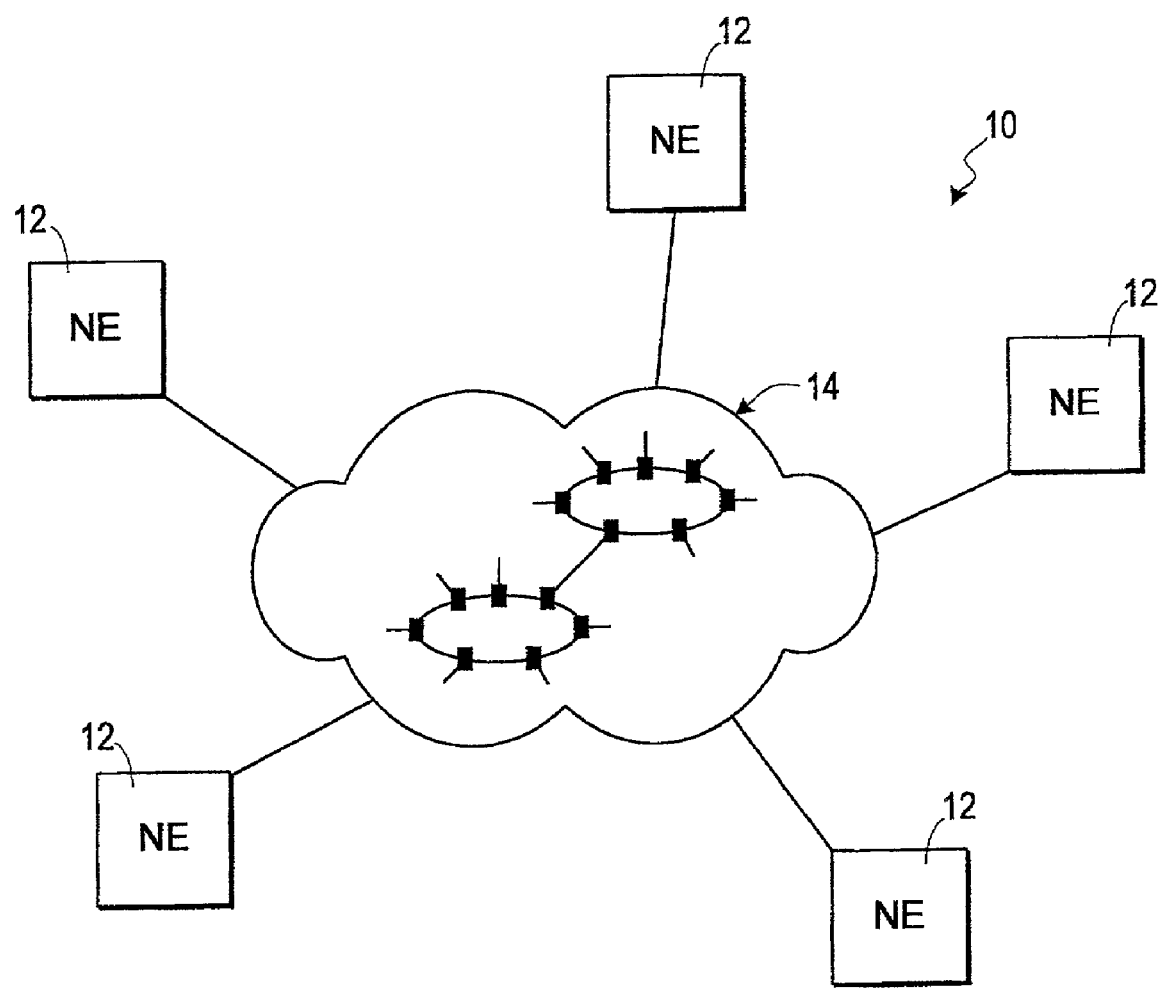
FIG. 1 is a schematic view of a transport network.

FIG. 1 of the drawings shows, generally indicated at 10, a transport network comprising a plurality of network elements 12 in communication with one another via a network infrastructure 14. The network infrastructure 14 may comprise further network elements or nodes, and/or sub-networks, arranged in conventional network configurations such as ring configuration, hub configuration, mesh configuration, point-to-point configuration, or a combination thereof. The network elements typically comprise transmission apparatus such as a router, a switch, a multiplexer, a regenerator or a cross-connect (not shown). The network 10 may, for example, comprise a synchronous transport network, or synchronous transmission system, such as a SONET and/or SDH network. In this case, the transmission apparatus are commonly known as synchronous transmission apparatus.

Figure 2:
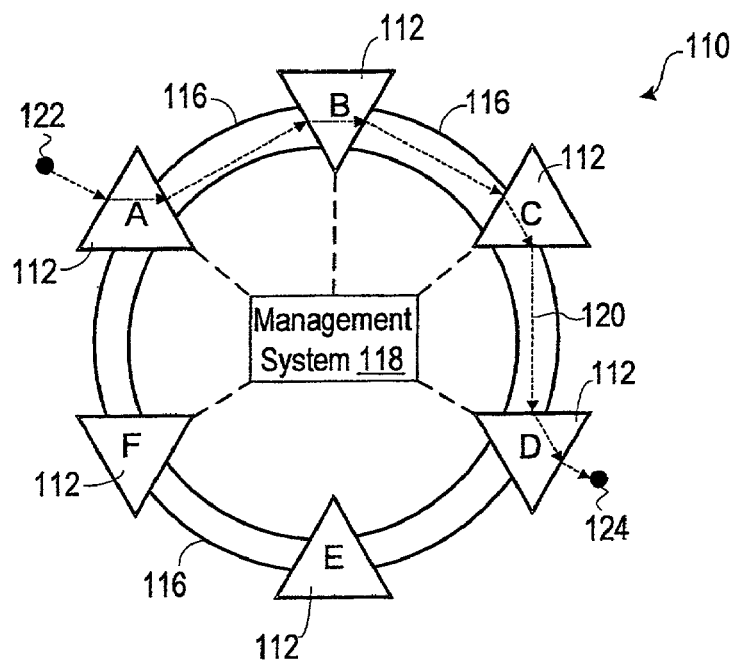
FIG. 2 is a schematic view of an example ring network.

For the purposes of illustration, the invention is described in the context of a synchronous transport network in the form of a simple ring network, but is not limited to such. FIG. 2 gives a schematic view of a ring network 110, being an example of the network 10. The network 110 includes network elements 112, labelled A, B, C, D, E and F, interconnected by network sections 116.

A synchronous transport network is arranged to transport data signals, or traffic, arranged in accordance with a data frame structure. There are a number of standard frame structures defined by, for example, ITU-T (International Telecommunications Union-Telecommunications standardization sector) and Bellcore (now known as Telcordia), that are commonly used in synchronous transmission systems. In SDH and SONET transmission systems, data signals are packaged into frames known as Synchronous Transport Modules (STMs) and Synchronous Transport Signals (STSs) respectively. An STM frame comprises a payload area, an AU pointer area and a section overhead (SOH) area. In the payload area data signals are mapped into containers, commonly referred to as Virtual Containers-(VCs) in SDH terminology. In SONET, the frame structure is substantially similar although the terminology differs, as is well known. For example, the SONET equivalent of section overhead is transport overhead (TOH) and, in SONET, containers are known as synchronous payload envelopes (SPEs). Each container, or envelope, also includes additional data known as the path overhead (POH). The payload data (i.e. the data carried in the payload area) comprises the main information that it is desired to transport across the network 10, 110 e.g. audio and/or visual data, while the path overhead data is normally used to carry information for use in end-to-end management of a path taken by the relevant data signal(s) across the network 10, 110. Within the payload area, some containers (known in SDH as low order data structures) may be nested inside larger containers (known in SDH as high order data structures). Both low order and high order data structures normally comprise path overhead.

Further control information, known in SDH as the section overhead (SOH), or equivalent overhead, is added to the frame. The normal purpose of the section overhead is to provide communication channels between adjacent network elements 12, 112 for functions including operations, administration and maintenance (OA&M) facilities, protection switching, section performance and frame alignment. The pointers, which are normally used to locate the containers/envelopes within the frame, are not relevant to the present invention and are not described herein.

Figure 3:
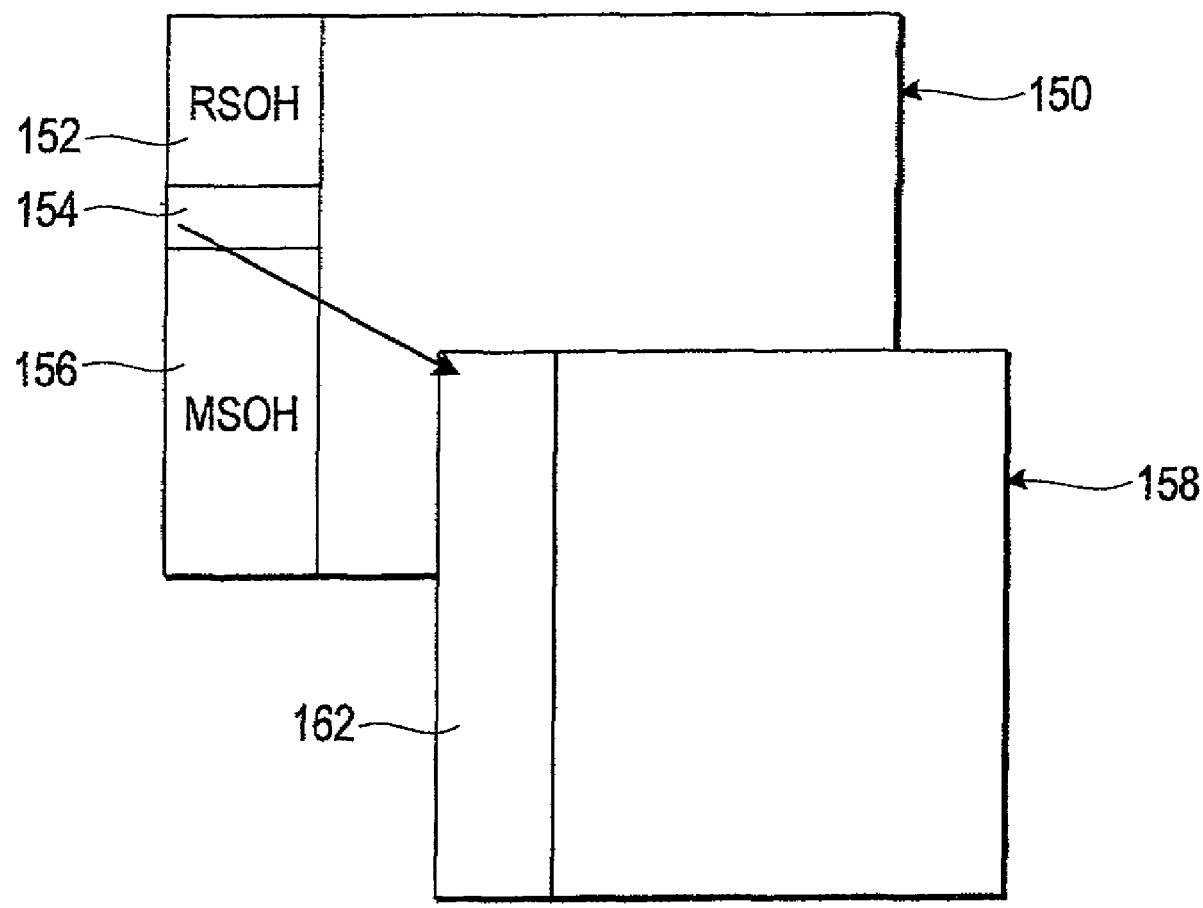
FIG. 3 is a representation of an STM data frame structure.

FIG. 3 is a representation of an STM data frame. In particular, FIG. 3 shows, by way of example only, a representation of an SDH STM-1 data frame 150 including Regenerator section overhead (RSOH) 152, AU pointers 154, Multiplex section overhead (MSOH) 156 and a VC-4 payload 158 having path overhead 162. The composition of SDH/SONET data frame structures are well known and are described in ITU-T standard G.707 and Telcordia GR253 respectively. Further equivalent standards include ATIS T1.105 and ETSI ETS 300 147.

Referring again to FIG. 2, there is shown a traffic signal, or data signal 120, being transported across network 110 from a source End System (ES) 122 to a destination End System (ES) 124. The End Systems 122, 124 may take any suitable form, for example a private telephone exchange or a PC (Personal Computer). The signal 120 is mapped into an appropriate container, e.g. VC or SPE, at network element A and transported in normal manner across the network 110 to network element D, via network elements B and C. At network element D, the signal 120 is extracted from the container for delivery to the destination End System 124. Thus, the portion of the signal 120 emanating from, and being received by, End Systems 122, 124 comprises the payload data, the path overhead data being respectively added and removed at network elements A and D. The route taken by the signal from network element A to network element B is commonly known as its path.

There are a number of different signal errors, or other problems, that may arise. Typically, these errors or problems relate either to the signal path or to a network section 116. In SDH/SONET part of the path overhead and section overhead are used to detect or record such errors or problems. Normally, the relevant components of the path overhead are used to carry information relating to errors or problems in the signal path, while the relevant components of the section overhead are used to carry information relating to errors or problems with the corresponding network section 116. For example, in SDH the path overhead for each VC-3 and VC-4 container comprises 9 bytes of which one byte, known as J1, carries path trace information for verifying the VC-3/VC-4 path connection. Another byte, known as B3, is used to provide bit error monitoring over the associated signal path. In the SDH section overhead two bytes, known as B1, B2, are used to provide parity checks. These and other bytes in the path and section overheads are effectively used to provide communication channels along the signal path or between network elements. A full description of the SDH and SONET path overhead and section overhead can be obtained from ITU-T standard G.707 and Telcordia GR253 respectively as well as ATIS T1.105 and ETSI ETS 300 147. The J1 byte is typically used to identify trail trace identification mismatch errors. In the example of FIG. 2, network element A may set J1 to a given value. Network elements B, C and D may be arranged to examine J1 and to expect J1 to be set to the given value. If network elements B, C or D determine that the value of J1 does not match the expected value then a trail trace identification mismatch is detected. The signal error bytes, such as B1, B2 and B3, may be used to assess the level, or severity of signal degradation. In some cases, a faulty signal may be replaced by an alarm signal, commonly known as AIS (Alarm Indication Signal), rather than propagate the faulty signal further through the network 10, 110. An AIS signal may also be used to occupy a signal time slot left vacant by a lost signal. Whenever a network element 12, 112 detects a fault or problem with a signal, it communicates the problem to a network management apparatus or system 118, such as a shelf equipment management function. The network management system 118 is commonly monitored by a human network manager (not shown) whose job it is to decide in which order to deal with the detected problems.

Conventionally, the decision is made based on the size of the faulty signal (e.g. it may be considered to be more important to fix a VC-4 signal (139264 kbit/s) than a VC-12 signal (2048 kbit/s)) and on the type of error/problem (e.g. it may be considered more desirable to fix a lost signal or a mis-directed signal than a signal suffering from relatively minor degradation). Because of the relatively large size of modern networks and sub-networks, it is increasingly common for organisations to purchase relatively complex and expensive management software to help the network manager sort through the typically large volume of error signals in order to decide which need the most urgent attention.

This arrangement is considered to be unsatisfactory since the relative importance of the data carried by the traffic signals, in particular the payload data, is not taken into account. For example, a high volume signal may carry relatively unimportant data. Similarly, a severe type of defect may affect only a small amount of data. It is considered that further information is required in order to properly determine the priority with which faulty signals require attention.

In accordance with the invention, signals are associated with a respective priority indicator, the setting of which indicates the relative importance of the data, in particular the payload data, carried by the signal. The network manager (human or automated) may use the information carried by the priority indicator to determine the relative urgency of fixing the associated signal. The information carried by the priority indicator may be used instead of, or together with, other indicators such as signal size and type of signal defect.

In the preferred embodiment, the priority indicator is included in the overhead associated with the signal. In an SDH/SONET network, the priority indicator is preferably included in the path overhead (or equivalent overhead) or the section overhead (or equivalent overhead). Placing the priority indicator in the path overhead is particularly appropriate when it is desired to be able to determine the relative importance of the data carried by a signal at one or more points along its path. Placing the priority indicator in the section overhead is particularly suitable when it is desired to be able to determine the relative importance of the data carried by a signal between two adjacent network elements 12, 112.

There follows a description of a particularly preferred embodiment of the invention in which the network 110 is assumed to be an SDH network and in which the priority indicator is included in the path overhead. The terminology used in the following description is SDH terminology although the invention is not limited to SDH. A skilled person will understand that the embodiment described herein may readily be applied to SONET, or similar, transport networks, particularly synchronous transport networks.

Figure 4:
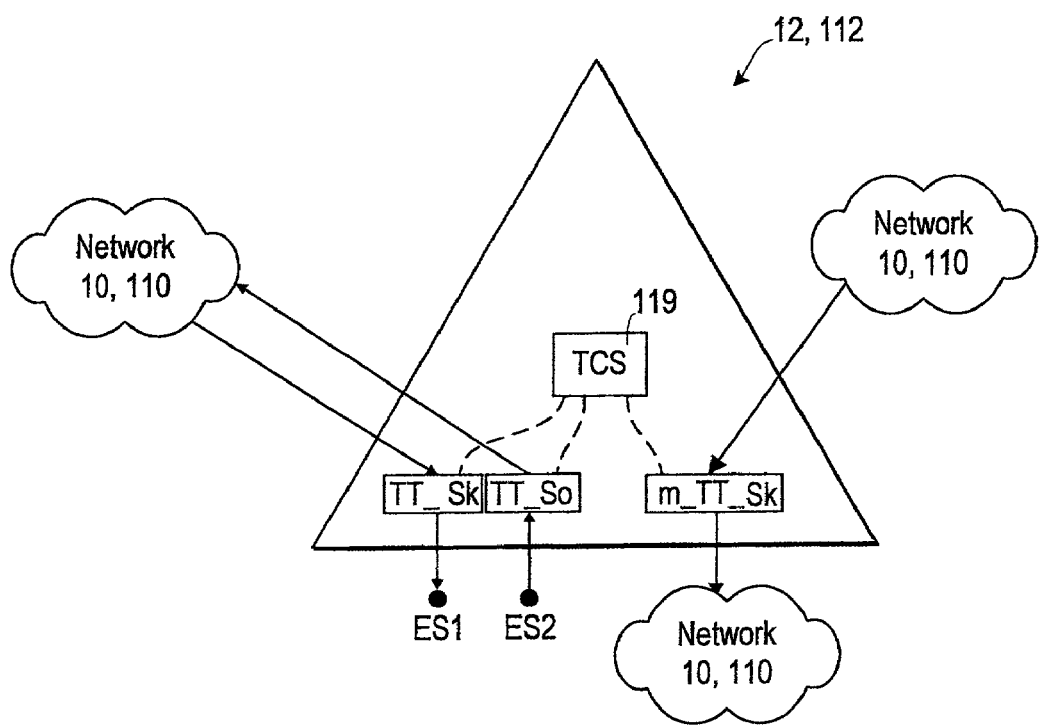
FIG. 4 is a schematic view of a network element.

FIG. 4 shows a schematic view of a network element 12, 112. Network elements 12, 112 comprise a plurality of function blocks or apparatus for performing a wide range of operations on traffic signals that are received at, transmitted by, or passing through the network element 12, 112. In SDH, the function blocks perform 'functions' that are defined in ITU-T standards G.783 and G.806, each of which is hereby incorporated herein by way of reference. The function blocks may be implemented in a number of ways but typically comprise hardware components or software components or a mixture of each, all arranged to implement the relevant SDH function. In the following description the term function is used to refer to the SDH function and to the apparatus or function block that is provided to perform the function. The names of the SDH functions as used in ITU-T G.783 and G.806 are also used herein. It will be noted that FIG. 4 shows only those functions that are required to give a skilled person an understanding of the present invention.

The network element 12, 112 includes a source function in form of a trail termination source function (TT_So) arranged to populate the path overhead of the Virtual Container carrying a traffic signal (as described in G.783 and G.806). The network element 12, 112 further includes a sink function in the form of a trail termination sink function (TT_Sk) arranged to terminate and examine the path overhead of the Virtual Container of a received traffic signal. The TT_So function is used particularly when a signal path is created—for example at network element A in FIG. 2 in creating a path for signal 120. The TT_Sk function is used particularly when terminating a signal path—for example at network element D in FIG. 2 in terminating the path for signal 120. Thus, in FIG. 4 it can be seen that the TT_So function receives a signal (sometimes referred to as a client signal) from an end system ES1 and populates the path overhead of the container into which the received signal is incorporated before the container is sent on to another element (not shown) of the network 10, 110. The TT_Sk-function receives a signal, carried by a Virtual Container, from the network 10, 110, terminates and examines the path overhead of the received container, the signal then being sent on to the destination end system ES2.

The network element 12, 112 includes a further sink function in the form of a trail Termination sink monitoring function (m_TT_Sk) arranged to examine the path overhead of a traffic signal being transported through the network element 12, 112 on its way to a destination node. For example, in FIG. 4 the m_TT_Sk function may be used by network elements B and C to examine the path overhead of the signal 120 as it makes way from network element A to network element D.

TT_So, m_TT_Sk and TT_Sk functions are also used to populate, monitor and terminate section overhead, or equivalent overhead.

Referring again to FIG. 2 by way of example, data placed in the path overhead of the signal 120 at network element A may be examined, or observed, at network elements B, C and/or D and be compared with expected values in conventional manner. The expected values for comparison purposes may be calculated by the network element 12, 112 that is performing the comparison (e.g. in the case of parity checks) or may be provided by the management system 118 (e.g. the management system 118 may provide an expected value for the Path Trace J1 byte to elements B, C and D).

The network element 12, 112 also includes a local control apparatus shown in FIG. 4 at 119. The local control apparatus 119 comprises an equipment management function for managing the operation of the network element 12, 112. In SDH, the equipment management function is commonly referred to as a traffic control system (TCS). The TCS 119 is normally arranged to control, or manage, the operation of some or all of the other functions in the network element 12, 112 including the TT_So, TT_Sk and/or m_TT_Sk, as applicable. The TCS 119 is also normally arranged for communication with the management system 118 in order to send and receive information regarding the operation and management of the network element 12, 112.

In accordance with the preferred embodiment of the invention, a component of the path overhead is arranged to serve as a priority indicator by carrying information indicating the relative importance, or priority, of the associated data signal, and in particular the relative importance of the payload data. In SDH, the path overhead of VC-4/VC-3 signals includes spare capacity, such as the communication channels provided by the F2 and Z3 bytes, which may be used as the priority indicator. For VC-2/VC-11 signals, some bits patterns in the K4 byte may be used to carry the priority indicator. For SONET VT SPEs, the Z6 byte or the Z7 byte (except bits 5 to 7) may be used to carry the priority indicator. For SONET STS SPEs, the Z3 or Z4 bytes may be used for this purpose. It will be appreciated that the above examples of spare overhead capacity are not limiting. By way of example only, Table 1 below shows how one or more bits of the F2 byte may be used as the priority indicator. In particular, bit 1 and bit 2 may be used as the priority indicator in the following manner:

TABLE 1

Example implementation using F2 byte

| Bit 1 | Bit 2 | Interpretation |
|-------|-------|-------------------|
| 0 | 0 | Low priority |
| 0 | 1 | Standard priority |
| 1 | 1 | High priority |

The example of Table 1 assumes that only three different levels of priority are required: low priority, standard priority and high priority. This information can be carried by two bits. If only two levels of priority are required, then one bit will suffice as the priority indicator. If more than four priority levels are required, then more than two bits will be required to act as the priority indicator.

The TT_So function in the network element 12, 112 that creates the path overhead associated with a traffic signal (i.e. when the signal is first incorporated into a container) is arranged to set the priority indicator in accordance with the importance of the payload data carried by the signal. In the present example, the TT_So function at network element A sets bit 1 and bit 2 of the F2 byte to indicate low, high or standard priority. Preferably, the TT_So function populates the priority indicator under the control of the management system 118 via the TCS 119. For example, a human network manager may determine that signals travelling from end system 122 to end system 124 are high priority and may configure the management system 118 to communicate this to the TCS 119 of network element A which in turn causes the TT_So function to populate the priority indicator accordingly. The management system 118 is preferably also arranged to communicate the priority level to the relevant network elements 12, 112 in the signal path thereby providing an expected value for the priority indicator against which the actual value can be compared when the signal 120 is received by the respective network element 12, 112. In the present example, the management system 118 communicates to network elements B, C and D that the signal 120 is high priority.

Some or all of the m_TT_Sk and TT_Sk functions of network elements that subsequently receive the traffic signal are arranged to examine the priority indicator associated with the signal. The m_TT_Sk and TT_Sk functions may be arranged to perform this examination on all received signals, or only on signals in respect of which a fault or defect has been detected, or at the request of the management system 118. For example, the m_TT_Sk and TT_Sk functions at network elements B, C and D may be arranged, always, or at the request of the management system 118, to examine the path overhead of signal 120 and to determine if the value of the priority indicator matches the expected value. If there is a detected mis-match between the expected value and actual value, then the respective network element B, C or D communicates to the management system 118 (typically via the respective TCS 119) that a fault has been detected. The respective network element B, C or D may also be arranged to communicate to the management system 118, either automatically or upon request, the expected priority value and/or the actual priority value. Alternatively, or in addition, the m_TT_Sk and TT_Sk functions at network elements B, C and D may be arranged to examine the priority indicator of signal 120 when the respective network element B, C or D detects a fault (e.g. trail trace identification mis-match, AIS or high bit error rate). In this case, when the respective network element B, C or D reports the detected fault to the management system 118, it also communicates the determined value of the priority indicator of the faulty signal. It will be noted that in some cases, e.g. when an AIS occurs, the original data signal is lost and so too is the associated priority indicator. In such cases, the respective network element B, C or D communicates the expected priority indicator to the management system 118.

This information allows the management system 118 or the human network manager to make a more informed decision as to how to prioritise signal faults. It is preferred that the respective network element B, C or D also determines whether or not the actual value of the priority indicator matches the expected value. This allows the respective network element B, C or D to determine whether or not it is communicating the correct priority level to the management system 118 in the event of a fault. The management system 118 is preferably able to query the match or mismatch status.

In order to implement the preferred embodiment of the invention the following modifications are made to the conventional hardware and software components of a network element 12, 112. A process or module is added to the TT_So function, which typically is implemented in hardware, so that the modified TT_So function is arranged to insert a value in the bit(s)/byte(s) assigned to the priority indicator. A process or module is added to the TT_Sk function, which typically is implemented in hardware, so that the modified TT_Sk function is arranged to observe, or examine, the value in the bit(s)/bytes(s) assigned to the priority indicator. A process or module is added to the m_TT_Sk function, which typically is implemented in hardware, so that the modified m_TT_Sk function is arranged to observe, or examine, the value in the bit(s)/bytes(s) assigned to the priority indicator.

It is preferred to provide the following detecting apparatus: a detector module for identifying a mismatch between expected and actual value of the priority indicator (priority mismatch detector); a detector module for identifying high expected priority on a signal which is detected as being an alarm indication signal (AIS on high priority detector); a detector module for identifying high expected priority on a signal which is detected as being misconnected (misconnected high priority signal); a detector module to configure the priority mismatch detector ON or OFF; a detector module to view the configuration of the priority mismatch detector; a detector module to configure the AIS on high priority detector ON/OFF; a detector module to view the configuration of the AIS on high priority detector; a detector module to configure the misconnected high priority signal detector ON/OFF; and a detector module to view the configuration of the misconnected high priority signal detector. With the exception of the priority mismatch detector, the detector modules conveniently take the form of computer software and may reside in any convenient location—for example as part of the TCS 119 or part of the TT_So, m_TT_Sk and/or TT_Sk functions—depending on how the components of the network element 12, 112 are implemented. The priority mismatch detector is preferably implemented in hardware.

It is further preferred to provide the following overhead configuration apparatus (conveniently in the form of software): a module to configure the transmitted priority indicator (where the transmitted priority indicator is the priority indicator normally allocated by a network operator and associated with the data signal at source (e.g. by the TT_So)); a module to view the transmitted priority indicator; a module to configure the expected priority indicator; a module to view the expected priority indicator (where the expected priority indicator is the priority indicator provided to receiving, or sink, functions such as the m_TT_Sk or TT_Sk functions); a module to view the received priority indicator (where the received priority indicator is the actual, or examined, priority indicator detected by the receiving, or sink, functions such as m_TT_Sk or TT_Sk); and a module to view the match/mismatch status of the expected versus received priority indicator. In the management system 18 a module is added to filter detected faults preferably on the basis of a mix of priority, signal size and type.

The preferred embodiment of the invention is particularly advantageous in that the management system 118 is provided with signal priority information. This enables the management system 118, and/or its human operator, to determine the urgency with which faults require attention not only on the basis of signal size and fault type, but also on the importance of the information being carried by the signal. Where a connectivity failure arises in a network 10, 110, the relevant priority indicator in combination with the trail trace identifier mismatch may be used to indicate to the monitoring point (management system) not only that the misconnection has occurred, but also the relative importance, or priority, of the signal that has been misconnected. Where a signal has been replaced by an alarm indication signal (AIS) the expected priority indicator at the monitoring point indicates the priority of the signal that has been lost.

Although the network element 12, 112 depicted in FIG. 4 is shown as having a TT_So function, an m_TT_Sk function and a TT_Sk function, it will be understood that each network element in a network or system that implements the invention does not necessarily need to comprise each of these functions. For example, in FIG. 2 if it is assumed that network element A is dedicated to sending signals to End System 122 and is not required to receive traffic signals from other network elements 12, 112 or to terminate traffic signals, then it may comprise only the modified TT_So function. Similarly, if network element D is only required to terminate data signals for sending to End System 124, then it need only comprise the modified TT_Sk function. Network elements B and C need only comprise the modified m_TT_Sk function if their only task is to transport traffic signals between network elements 12, 112. In practice, it is desirable for network elements 12, 112 to be versatile and it is preferable therefore for each network element 12, 112 that implements the invention to comprise a modified TT_So function, a modified m_TT_Sk function and a modified TT_Sk function.

The foregoing description of a preferred embodiment relates particularly to an SDH network where the signal is carried in a VC-3 or VC-4 container and the priority indicator is carried in the path overhead. It will be understood that the invention is not limited to use with VC-3 or VC-4 signals: the priority indicator may be incorporated into spare capacity in the overhead associated with any signal (e.g. the K4 byte of a VC-2/VC-11 signal). Further, the priority indicator need not necessarily be included in the path overhead: it may alternatively be included in the section overhead of any STM, or equivalent, data frame structure (e.g. in the Z0 or F1 bytes of SDH section overhead). Still further, the invention is not limited to use with SDH networks: the invention may be used with other network types, particularly synchronous transport networks, including SONET. In general, any spare communication channel associated with a traffic signal may be used as a priority indicator. The implementation of such alternative embodiments of the invention may readily be made by modification of corresponding function blocks and overhead that are equivalent to those described in the foregoing description of a specific embodiment of the invention.

The invention is not limited to the embodiment described herein which may be modified or varied without departing from the scope of the invention.

The invention claimed is:

1. A system for prioritising faults in a transport network comprising a plurality of network elements arranged to transport data signals comprising respective overhead data and payload data, the system comprising:
   at least one first network element arranged to include in said overhead data a priority indicator indicating the relative importance of the respective payload data; and
   at least one second network element arranged to examine the respective priority indicator of data signals,
   the system being arranged to prioritise each fault detected in respect of a data signal using at least the value of the respective priority indicator wherein the priority indicator is included in said overhead data in a synchronous transport network.

2. A system as claimed in claim 1, wherein said at least one first network element is arranged to receive said payload data, to create said overhead data and to incorporate said created overhead data and said payload data into a data signal suitable for transportation across said network.

3. A system as claimed in claim 1, wherein said at least one second network element is arranged to terminate data signals.

4. A system as claimed in claim 1, wherein said at least one second network element is arranged to receive data signals from, and forward data signals to, one or more other of said network elements.

5. A system as claimed in claim 1, wherein each of said network elements is arranged to serve as a first and a second network element.

6. A system as claimed in claim 1, further including a management apparatus arranged for communication with said at least one first network element in order to provide respective values at which to set said priority indicator thereto, and arranged for communication with said at least one second network element in order to receive respective values of examined priority indicators therefrom.

7. A system as claimed in claim 6, in which said at least one second network element is arranged to receive from said management apparatus a respective expected value for said priority indicators, wherein said at least one second network element is arranged to compare said respective expected priority indicator values with the respective examined priority indicator values and to detect a signal fault upon determination of a mismatch.

8. A system as claimed in claim 1, wherein said priority indicator is included in overhead data associated with the path taken by the respective data signal across said transport network.

9. A system as claimed in claim 1, wherein said priority indicator is included in overhead data associated with a section of said transport network.

10. A system as claimed in claim 1, wherein said transport network comprises a synchronous transport network.

11. An apparatus for use in prioritising faults in a transport network comprising a plurality of network elements arranged to transport data signals comprising respective overhead data and payload data, said overhead data including a priority indicator indicating the relative importance of the respective payload data, wherein the apparatus is arranged to determine the priority indicator of a data signal in respect of which a fault is detected and to communicate the value of the priority indicator to a management apparatus wherein the priority indicator is included in said overhead data in a synchronous transport network.

12. An apparatus as claimed in claim 11, arranged to receive, from a management apparatus, a respective value at which to set said priority indicator, and being further arranged to include the priority indicator in said overhead data.

13. An apparatus as claimed in claim 11, wherein the apparatus is arranged to receive, from a management apparatus, a respective expected value for said priority indicator, to compare said respective expected priority indicator value with a respective examined priority indicator value, and to detect a signal fault upon determination of a mismatch.

14. An apparatus as claimed in claim 11, wherein the apparatus is arranged to receive, from a management apparatus, a respective expected value for said priority indicator, wherein, upon detection that a data signal has failed to reach said apparatus, said apparatus is arranged to communicate to said management apparatus said failure and said respective expected value.

15. An apparatus as claimed in claim 11, wherein said priority indicator is included in overhead data associated with the path taken by the respective data signal across said transport network.

16. An apparatus as claimed in claim 11, wherein said priority indicator is included in overhead data associated with a section of said transport network.

17. An apparatus as claimed in claim 11, wherein said transport network is a synchronous transport network and said apparatus includes a trail termination source function (TT_So) arranged to include said priority indicator in said overhead data.

18. An apparatus as claimed in claim 11, wherein said transport network is a synchronous transport network and said apparatus includes a trail termination sink function (TT_Sk) arranged to examine said priority indicator.

19. An apparatus as claimed in claim 11, wherein said transport network is a synchronous transport network and said apparatus includes a trail termination sink monitoring function (m_TT_Sk) arranged to examine said priority indicator.

20. A method of prioritising faults in a transport network comprising a plurality of network elements arranged to transport data signals comprising respective overhead data and payload data, the method comprising:

including in said overhead data a priority indicator indicating the relative importance of the respective payload data; examining, in respect of a data signal for which a fault is detected, the respective priority indicator; and prioritising said detected fault using at least the value of said respective priority indicator wherein the priority indicator is included in said overhead data in a synchronous transport network.

21. A system for prioritising faults in a transport network in which a data signal is transported across the network along a path comprising one or more network elements, the data signal comprising overhead data and payload data, the system comprising a management apparatus arranged to associate with said data signal a priority indicator the value of which indicates the relative importance of the payload data and being further arranged to communicate the priority indicator to one or more network elements in said path, wherein, upon detection by a network element in said path that said data signal has failed to reach said network element, said network element is arranged to communicate said failure and the value of said priority indicator to said management apparatus wherein the priority indicator is included in said overhead data in a synchronous transport network.

22. A system for prioritising faults in a transport network in which a data signal is transported across the network along a path comprising one or more network elements, the data signal comprising overhead data and payload data, the system comprising a management apparatus arranged to associate with said data signal a priority indicator the value of which indicates the relative importance of the payload data and being further arranged to communicate the priority indicator to one or more network elements in said path, wherein, upon detection by a network element in said path of a fault in said data signal, said network element is arranged to communicate the value of said priority indicator to said management apparatus wherein the priority indicator is included in said overhead data in a synchronous transport network.

23. A system as claimed in claim 22, wherein said management apparatus is arranged to cause said priority indicator to be included in the respective overhead data of data signals and wherein, upon receipt by said network element of a data signal in respect of which a fault is detected, said network element determines the value of said priority indicator from the respective overhead data.

24. A system as claimed in claim 22, wherein, in the event that said fault causes said data signal to fail to reach said network element, said network element determines the value of said priority indicator from the respective priority indicator communicated to it by the management apparatus.

* * * * *